Figure 1:
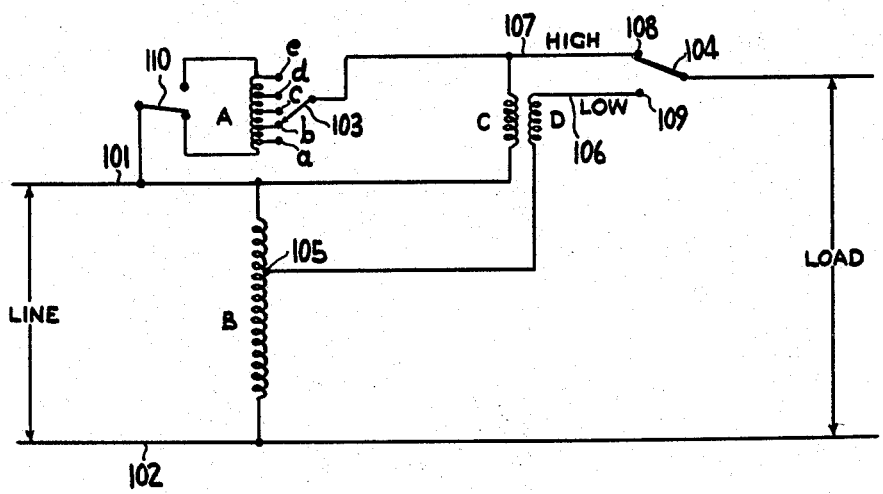

Dec. 10, 1963  J. L. MICHAELIS  3,114,100
VOLTAGE REGULATOR
Filed Feb. 12, 1958  2 Sheets-Sheet 1

INVENTOR.
JOHN L. MICHAELIS
BY Oscar L. Spencer
ATTORNEY

Dec. 10, 1963     J. L. MICHAELIS     3,114,100
VOLTAGE REGULATOR

Filed Feb. 12, 1958     2 Sheets-Sheet 2

INVENTOR.
JOHN L. MICHAELIS
BY Ozark Spencer
ATTORNEY 3,114,100
VOLTAGE REGULATOR
John L. Michaelis, Pittsburgh, Pa., assignor, by mesne assignments, to Pittsburgh Plate Glass Company
Filed Feb. 12, 1958, Ser. No. 714,838
5 Claims. (Cl. 323—45)

The present invention relates to voltage control devices and more particularly to improvements in tap changing under load transformers and induction regulators utilized to vary voltage input to rectifier systems which supply direct current power to a load requiring a variable voltage.

In some direct current power applications semiconductor type rectifiers such as germanium and silicon rectifiers are now employed because of their increased efficiency over other types of rectifiers. In applications requiring variable direct current voltage however semiconductor type rectifiers require special equipment. In contrast to former rectifiers such as mercury arc rectifiers, which through grid control or delayed firing circuits were capable of providing substantially any desired direct current output voltage, germanium, silicon and other similar rectifiers inherently possess no voltage control ability. The direct current output voltage of germanium and silicon rectifiers therefore has a fixed mathematical relation to the alternating current input voltage. Direct current output of these rectifiers is therefore usually accomplished by varying alternating current input voltage supply.

Many industrial operations employing direct current power require a variable direct current voltage output during operation. Thus, in the production of chlorine and caustic from brine by electrolytic dissociation in an electrolytic cell it is found that a back electromotive force (E.M.F.) is always present in the cells. This electromotive force is such that at 65 percent normal direct current input voltage only a very small flow of current occurs. The direct current increases proportionally as the voltage is increased from 65 to 100 percent of normal values. This back electromotive force is present in other electrolytic cells and in such cases, voltage control from the rectifiers employed is a practical necessity to start up, to control and to vary the production rates of the cells.

In order to control voltage from 65 to 100 percent of the normal voltage a conventional tap changing under load transformer such as described in U.S. Patent 2,780,768 is employed in the alternating current supply line in power systems employing rectifiers having no voltage control ability. A transformer of this type would of necessity carry a voltage control rating of ±21.2 percent it were employed to control direct current voltage in this manner to an electrolytic cell line. A tap changing under load transformer or an induction regulator having a voltage control rating of 100 percent to 65 percent represents a substantial investment since the percentage regulation provided by the transformer or regulator determines in great part the total cost of the device. Generally speaking, the greater the amount of voltage regulation provided by the device the greater the cost.

The present invention permits considerable reduction in the size and rating of a tap changing under load transformer or induction regulator necessary to control voltage in a given range. In addition to reducing the physical size and rating with the consequent reduction in transformer cost, the present invention permits a much finer control of voltage within the given range.

Thus according to this invention an auxiliary transformer is employed which works in conjunction with a standard tap changing under load transformer such as described in U.S. Patent 2,780,768 or an induction regulator and provides a larger range of voltage regulation for the tap changing transformer or regulator than they inherently possess. Tap changing transformers and induction regulators provide a fixed voltage and a variable voltage. The variable voltage is usually added to or subtracted from the fixed voltage and thus supplies the overall voltage regulation of the device. In accordance with this invention the auxiliary transformer employed with the tap changing transformer or induction regulator is fed or supplied through the variable output voltage means of the tap changing transformer or induction regulator and the auxiliary transformer multiplies or divides the voltage supplied thereto and adds or subtracts it from the fixed voltage output of the fixed output voltage means of the tap changing transformers or induction regulator. Utilizing an auxiliary transformer in this manner voltage may be regulated over a wide range while employing a tap changing under load transformer or induction regulator having but a very small voltage control rating.

For a clearer understanding of the present invention reference is made to FIGS. 1, 2, 3, 4 and 5 which show diagrammatically the use of an auxiliary transformer working in conjunction with a tap changing under load transformer.

Figure 2:
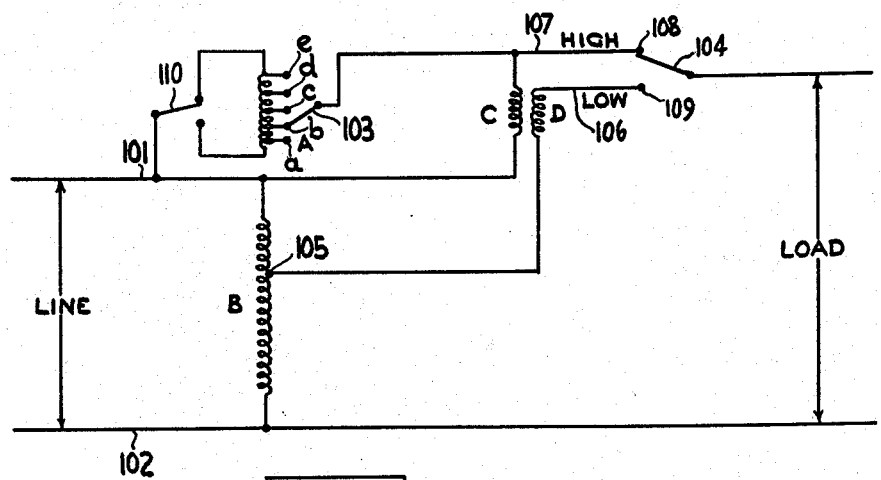

FIGS. 1 and 2 show a typical tap changing under load transformer A—B having input terminals 101 and 102. Winding A is provided with a plurality of taps $a$, $b$, $c$, $d$ and $e$ which are contacted by tap switch mechanism or means 103 of line 107. Switch means 110 is associated with winding A to buck or boost the fixed voltage output. Line 107 has a contact 108 positioned thereon. Winding D of transformer C—D is connected to a voltage tap 105 on excitation winding B of transformer A—B. Winding C of transformer C—D is connected so as to be excited by the output voltage of winding A. A two way switch 104 is provided which connects the output of the tap switch mechanism or means 103 and line 107 to load in one position and in a second position connects the load to a contact 109 on an output terminal 106 of winding D of transformer C—D.

In FIGS. 1 and 2, as will be readily apparent to one skilled in the art, transformer C—D is not utilized for all practical purposes. Thus voltage regulation in these two figures is accomplished solely through the typical tap changing under load transformer A—B. Voltage regulation in these figures is therefore conventional as in any tap changing transformer.

Figure 3:
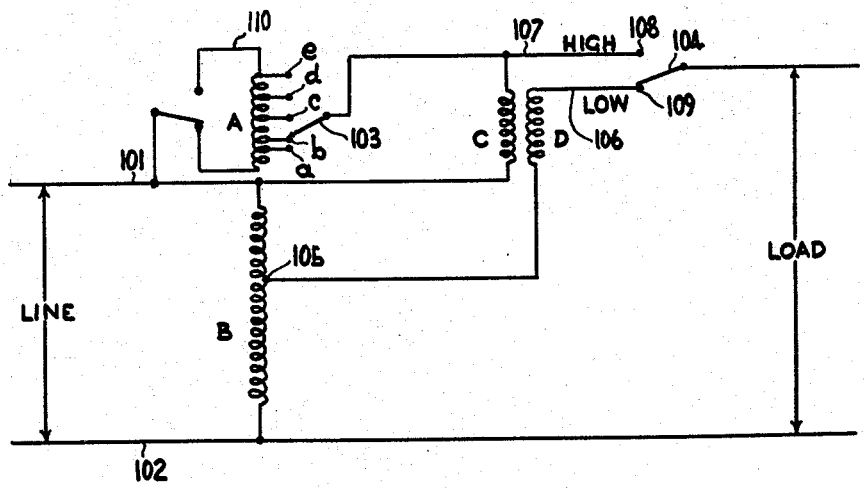
Figure 4:
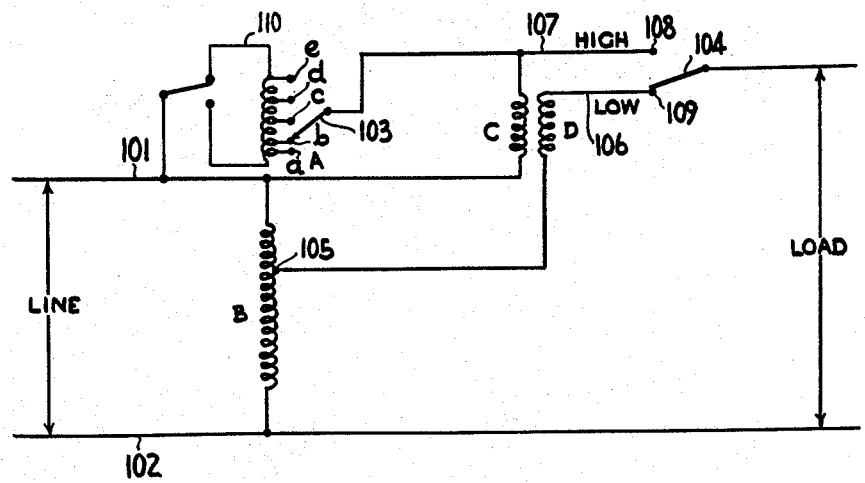

In FIGS. 3 and 4 the auxiliary transformer is utilized to supply the load through switch 104. FIG. 3 shows the transformer A—B connected in a "boost" position. Auxiliary transformer winding C is excited through winding A of the tap changing transformer. Depending on the design ratio of turns between winding C and D, excitation of winding C will produce a voltage in winding D. This induced voltage in D is added to or subtracted from the fixed voltage tap 105 of the transformer A—B depending upon the connection of winding A, that is, whether winding A is in "boost" or "buck" position.

Figure 5:
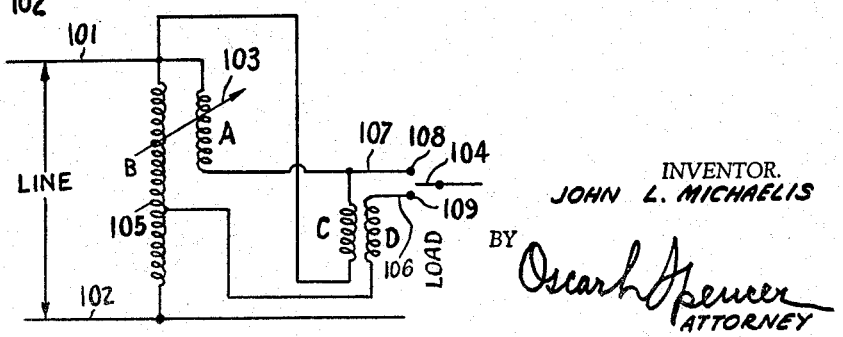

FIG. 5 shows an induction regulator A—B utilized with an auxiliary transformer C—D to supply voltage regulation in the same manner as voltage regulation is supplied by the tap changing under load transformer A—B of FIGURES 1, 2, 3 and 4. In the figure, power is supplied to the winding B through leads 101 and 102. A central tap 105 is provided on the winding B and is connected through a suitable lead to the winding D of the auxiliary transformer. C represents the primary winding of the auxiliary transformer. Regulation of the output of the induction regulator is provided by means of switch 103 shown diagrammatically. Utilization of the auxiliary transformer C—D is accomplished by means of a switch 104 which may be connected to lead 108 or 109, in the same manner as the auxiliary transformer utilized in FIGURES 1, 2, 3 and 4 is connected or disconnected.

As will be apparent therefore, it is possible with the use of an auxiliary transformer as outlined above to provide a wide range of voltage regulation at a decreased kva. capacity in a tap changing under load transformer or induction regulator while utilizing devices having but a small voltage range and large kva. rating. Regulation in the high voltage ranges is provided by a tap changing under load transformer or induction regulator having a small voltage range. In the low voltage ranges the auxiliary transformer provides a wide range of voltage control working through the tap changing mechanism by appropriate connections made thereto.

The operation of the device of FIGS. 1 through 4 in controlling semi-conductor type rectifiers supplying power to a chlorine cell circuit requiring an input voltage control to the cells of from about 65 percent to 100 percent of normal voltage is as follows.

A conventional tap changing under load transformer (A—B) having a 500 kva. (kilo-volt-amperes) regulating capacity with a ±7½ percent output voltage control is provided. A voltage tap 105 is provided at 81.2 percent of the total voltage across the primary winding B of the tap changing under load transformer. A secondary range changing auxiliary transformer C—D is provided having a primary winding C and a secondary winding D with the turns ratio being 1 to 1.51. Primary winding C is designed so that the volts, current and kva. design of this winding equal those of winding A of the tap changing under load transformer. The winding D of the auxiliary transformer is designed such that the volts equal 151 percent of A, the current equals 66.37 percent of A and the kva. equals A.

With the voltage control system connected as in FIG. 4, then 65 percent of the maximum alternating current voltage is applied to the rectifiers supplying the cell circuit when stepping switch 103 is in maximum buck position. By moving switch 103 from one tap to another in the "buck" position to the tap line 101, a gradual increase in voltage supply to the cells through the rectifier is provided until 75.3 percent of the normal voltage is supplied. Upon attaining this voltage the boost connection of FIG. 3 is effected and once more by movement of the tapping switch 103 voltage is gradually increased from 75.3 percent to 86.05 percent of the normal voltage.

When this voltage range is reached the switch 104 is transferred from the low voltage position to the high voltage position with the winding A being in a "buck" position, as shown in FIG. 2. In this position voltage may be regulated from 86.05 percent to 93.0 percent of normal alternating current. By reversing the connection of winding A as in FIG. 1 further control is provided in the range of 93.0 to 100 percent.

Thus as is readily seen a gradual increase in voltage is accomplished from 65 to 100 percent of the normal alternating current output voltage utilizing a tap changing under load transformer with a very low range voltage control rating. If the combination of the instant invention were not employed to control voltage from 65 to 100 percent of the normal alternating current output voltage, a tap changing under load transformer with a kva. rating three times that of the tap changing transformer employed in accordance with this invention would be required. In addition, the system shown provides double the number of steps to go from low to high voltage in a conventional tap changing transformer.

The auxiliary transformer need not be installed in the same unit with the tap changing under load transformer but if desired may be located externally or even remotely from the tap changer. While the invention has been described with reference to a specific type of tap changing under load transformer, it will be obvious to the skilled in the art that the same results may be accomplished using an auxiliary ratio changing transformer in conjunction with an autotransformer, or an induction regulator merely by associating the auxiliary transformer with the regulating mechanism in the manner shown in the drawing by appropriate circuity.

The circuits shown in FIGS. 1 through 4 are shown in simplified form to illustrate the invention. In practice it will be beneficial to reverse the polarity of either winding C or D as shown in these drawings.

Thus, switch 104 may move from high position, the contact on line 107, to low position, the contact on line 106, with a minimum practical voltage difference between high and low position contacts. This is possible since in FIG. 2 at maximum "buck" the output voltage is 92.5 percent of the supply voltage. Also in FIG. 3 at maximum boost the output voltage is 92.5 percent of the supply voltage. With this condition existing, that is, line 107 and line 106 simultaneously both at 92.5 percent input line voltage potential, a load make, load break switch 104, may be utilized to transfer the load from line 107 to line 106, at a constant voltage level without interruption to the output load, and with a minimum of arcing or burning of contacts.

While the invention has been described with reference to a specific voltage regulating device and auxiliary transformer, it is of course not intended that the invention be so limited since many types of voltage regulating devices can be employed in place of the one shown and auxiliary transformers having different turns ratios employed. Also, as will appear obvious to one skilled in the art, winding B must be designed to provide an increased kva. rating to supply energy at the tap point 105.

The attached drawings, FIGURES 1, 2, 3 and 4, are shown as a single phase circuit and transformer. It is understood that most power applications are three phase and in some cases two phase and the invention discussed herein applies equally to multiphase power type tap changing under load transformer circuits.

Circuity employed may also vary somewhat depending on the voltage regulating device employed with the auxiliary range changing transformer but such modifications will be apparent to those skilled in the art in practicing this invention which is to be limited only by the scope of the appended claims.

I claim:

1. An alternating current voltage control device comprising a voltage regulator having fixed output voltage means and a variable output voltage means thereby providing a fixed output voltage and a variable output voltage, switch means associated with the variable output voltage means to add said variable voltage to the fixed output voltage when in one position and to subtract said variable voltage from the fixed output voltage in a second position, an auxiliary transformer having a primary winding and a secondary winding, said primary winding being connected in parallel with the variable output voltage means, said secondary winding being in series with said fixed output voltage means, means to supply excitation for the primary winding of said auxiliary transformer from the variable output voltage means of said voltage regulator, switch means positioned and adapted to connect the voltage regulator to load while in one position and to connect the voltage regulator and auxiliary transformer to load while in a second position.

2. The device according to claim 1 wherein the voltage regulator is a load tap changing transformer.

3. The device according to claim 1 wherein the voltage regulator is a load tap changing auto transformer.

4. A voltage regulating system comprising a tap changing under load transformer having an excitation winding and regulating winding, input terminals connected across said excitation winding, a plurality of spaced taps on said regulating winding, a stepping switch connected to said regulating winding and capable of moving from one tap to another under load to vary the voltage output of said regulating winding, an output terminal from said stepping switch adapted for connection to a load, an output terminal on said regulating winding, an auxiliary transformer having a primary winding and a secondary winding, said primary winding being connected across the output terminal of said stepping switch and the output terminal of said regulating winding and in parallel with said regulating winding, said secondary winding being connected in series with the excitation winding of said tap changing transformer and having an output terminal adapted for connection to a load, a movable switch adapted to connect the output terminal of said stepping switch to load in one position and to connect the output terminal of the secondary winding of said auxiliary transformer to load in a second position.

5. The device according to claim 1 wherein the voltage regulator is an induction regulator.

References Cited in the file of this patent

UNITED STATES PATENTS

| | | |
|---|---|---|
| 780,048 | Lincoln | Jan. 17, 1905 |
| 2,231,721 | Jansa | Feb. 11, 1941 |
| 2,959,728 | Sealey | Nov. 8, 1960 |